United States Patent [19]

Steward

[11] 4,159,194

[45] Jun. 26, 1979

[54] CRYSTALLIZATION APPARATUS AND PROCESS

[75] Inventor: Frederick A. Steward, Zelienople, Pa.

[73] Assignee: Dart Industries Inc., Los Angeles, Calif.

[21] Appl. No.: 837,134

[22] Filed: Sep. 28, 1977

[51] Int. Cl.² ............................................. B01D 9/02
[52] U.S. Cl. ...................................... 23/301; 422/245
[58] Field of Search ............... 23/301, 273 R, 273 F; 62/541, 544; 422/245

[56] References Cited

U.S. PATENT DOCUMENTS

| | | |
|---|---|---|
| 3,298,796 | 1/1967 | Weele et al. .......................... 62/541 |
| 3,615,246 | 10/1971 | Lindstrom .......................... 23/301 R |
| 3,743,705 | 7/1973 | Sumner .............................. 23/301 R |
| 4,004,886 | 1/1977 | Thijssen et al. ....................... 23/301 |
| 4,056,364 | 11/1977 | Dmitrovsky et al. ............. 23/273 R |

*Primary Examiner*—Hiram H. Bernstein
*Attorney, Agent, or Firm*—Margareta LeMaire; Bryant W. Brennan

[57] ABSTRACT

A crystallization apparatus and process especially useful for the continuous regeneration of metal processing solutions, such as copper etchants, where direct recovery of metal values in the form of large crystals of high solids content is achieved and fouling of heat exchange surfaces is obviated by a scouring action obtained through addition of preformed crystals to the heat exchange zone.

16 Claims, 1 Drawing Figure

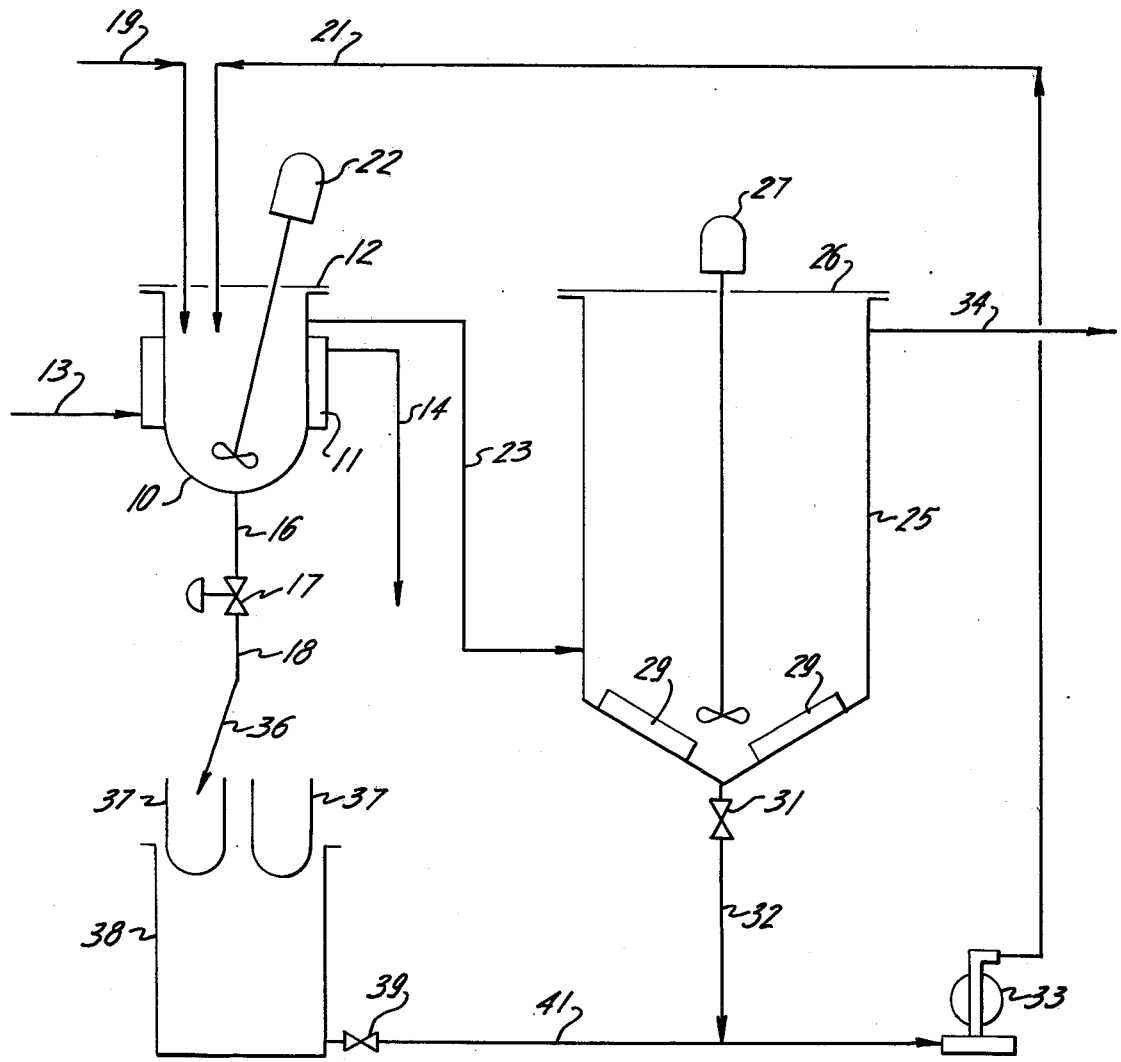

CRYSTALLIZATION APPARATUS AND PROCESS

BACKGROUND OF THE INVENTION

There are many metal finishing processes, e.g., plating, etching, pickling, brightening, etc., where either salt impurities or metal values build up continuously in the treatment solutions to undesirably high levels during use, ultimately requiring discharge or regeneration of said solutions. Since the spent solutions usually contain valuable constituents in the form of considerable residual quantities of reactants and/or metal values, regeneration of the solutions for removal of the impurities or metal values, e.g., by crystallization, is desirable. As is well known, crystallization of a chemical compound such as a salt from a solution is caused by a temperature change in the solution and begins whenever the solubility of the salt is exceeded in view of this temperature change. Crystal formation on cooling normally occurs on the lowest temperature surface, such as on cooling coils, heat exchangers, tank walls etc. Similarly in those cases where the solubility of a compound decreases with increasing temperature, the crystal formation occurs on the hottest surfaces, i.e, the heat transferring surfaces. Crystal removal under these conditions requres an intense labor effort. In large production systems for the manufacture of crystalline chemicals, evaporation and spray crystallization with drying is most often used to avoid contact between heat exchange surfaces and the pregnant liquor. Other systems use a continuous scraper mechanism to keep the heat exchange surfaces cleaned. The crystal product is usually recovered as relatively dilute slurrys and need to be concentrated in equipment such as centrifuges and hydrocyclones. However, the use of these types of sophisticated and complex equipment for regeneration of metal processing solutions is not feasible from either a practical or economical standpoint for the average metal processor. Specifically, the quantities of the materials to be crystallized are usually very low, and the total inventory of spent solutions are relatively small, generally not exceeding 800 gallons. Typically, the amount of impurities or metal salts to be recovered by crystallization ranges between a few ounces to a maximum of 30 pounds per hour. Also the spent solutions to be regenerated are often highly corrosive requiring that all equipment, which is in contact with the solution be constructed of expensive corrosion resistant metals or metal alloys.

The present practice in metal finishing is therefore to cool (or heat) the solution to be regenerated by inserting cooling (heating) coils into a spent solution. As the temperature is changed, crystallization occurs on the coils which are then removed from the solution to be regenerated, either at the time the desired crystallization temperature has been reached and the crystallization is completed, or when the heat exchange surfaces appear insulated due to crystal growth. The crystals are removed from the coils by scraping or by redissolution in water. Because of the inherent detrimental change in heat transfer rate as the crystals build up on the coils, and ultimate fouling of the heat exchange surfaces, the above described method does not lend itself to a continuous regeneration process. Furthermore, the presently used method requires considerable manual handling, which is both costly and hazardous, since the solutions to be treated are generally quite noxious. Another disadvantage of the aforementioned method is that it provides no control over the crystal size distribution.

It is therefore an object of this invention to provide a novel apparatus and process for the continuos removal of a salt from a solution by crystallization.

Another object is to provide an apparatus and process for the continuous direct recovery of a concentrated salt crystal slurry.

Still another object is to provide an inexpensive and efficient apparatus and process for the continuous regeneration of corrosive metal processing soltions.

A further object is to provide an apparatus and continuous process for the recovery of crystals of a controlled particle size distribution.

Other objects and advantages will become apparent from a reading of the detailed description of the invention.

The FIGURE is a schematic depiction of the apparatus and process flows of the invention.

THE INVENTION

It is known that in the presence of previously formed crystals, growth of crystals is favored at the expense of formation of new crystal nuclei. Based on this theoretical background, it was found that by effecting a rapid heat exchange, whereby the desired temperature change in the solution is approached or attained during the time it would normally take for crystal nuclei to form, while simultaneously scouring the heat exchange surfaces with a profusion of preformed crystals, crystal growth on the heat exchange surface can be completely eliminated.

The process and the apparatus of this invention is generally applicable to the crystallization of any material from a solution.

The crystallization is carried out in a smooth-walled metallic heat exchange vessel, provided with a jacket or an external coil in contact with the wall through which either a cooling or heating medium is circulated, depending upon whether the solubility limit of the material to be crystallized is to be exceeded by a reduction in temperature or by a temperature increase.

The spent solution is continuously introduced to the heat exchange vessel into which also is introduced a sufficient amount of slurry of preformed crystals from a second vessel serving as a reservoir-settling tank to provide an initial crystal concentration in the heat exchange vessel from about 5 to about 50 weight percents. The contents of the heat exchange vessel is vigorously agitated to provide the desired scouring action by the crystals. The larger crystals, which are heavy enough to settle are collected in a quiescent zone provided by a settling leg, which is downwardly extending from the heat exchanger vessel. The settled crystals are periodically withdrawn from said settling leg as a product of the process. The solution containing the smaller crystals overflows into the second vessel, which provides a longer retention time for additional crystal formation and growth. It has a gentle agitation mechanism to suspend the smallest crystals but yet allows the maintenance of an upper quiescent zone from which the crystals have settled out and from which the regenerated solution is withdrawn. The heavier crystals in this vessel settle towards the bottom of the vessel and are withdrawn and recycled to the heat exchange vessel as the slurry of preformed crystals.

It is evident that sizing of the two vessels, the heat exchange surface area, heat exchange to be effected, rate of agitation, etc will depend on the following factors: (a) the solubility gradient of the chemical compound to be removed by crystallization; (b) the quantity of the chemical compound to be removed from each volume of the solution to be regenerated per unit of time, and (c) the quantity of heat to be transferred through the heat exchange surface. From the following detailed description of the process and discussion of the equipment utilized, it will be easily understandable for those familiar with the art what the particular conditions should be for each application.

The attached drawing is a schematic illustration of the process of this invention and the system used for carrying out said process. It should be understood that the drawing is only presented in sufficient detail to provide a full understanding of the invention, and that there are valves, conduits, timers, temperature recorders and controllers and various other auxiliary equipment, which have not been shown.

In the FIGURE, there is indicated at 10 an open top, cylindrical metallic vessel having a dished or conical bottom and polished interior surfaces. The vessel is provided with a removable cover 12 and an external heat exchange jacket 11 through which circulates a heat exchange liquid by means of conduits 13 and 14.

Downwardly extending from the bottom of vessel 10 there is a solids settling leg 16, an automatically operated valve 17 of the pinch or straight-through diaphragm type and conduit 18. The valve through which crystal product is withdrawn, is controlled by a set of frequency and internal timers (not shown), which periodically cause the valve to change from a fully closed to a fully open position. The size and capacity of the settling leg can be varied within considerable limits to fit the conditions of operations. In the case of a 40–50 gallon vessel size, the leg can be a 1 to 1½ inch ID pipe some 4 to 40 inches long. Through the cover 12 there are provided conduit 19 for introduction of solution feed and conduit 21 for introduction of crystal slurry recycle. The contents of vessel 10 is vigorously agitated by means of variable speed agitator 22, which is preferably positioned at an angle to promote top-to-bottom mixing and scouring of the heat exchange surfaces by the crystals.

Overflow line 23 provided near the top of vessel 10 conducts liquid into the adjacently located, cylindrical, open top vessel 25 by gravity flow. Vessel 25 is equipped with removable cover 26 and agitator 27, which extends downwardly into the conical bottom portion of the vessel. This vessel is preferably provided with a set of baffles 29 to prevent vortexing of the agitated contents. Valve 31, which is located at the end of the conical section of vessel 25, conduit 32 and pump 33 located in conduit 21 function to introduce the crystal recycle slurry into vessel 10. The pump action is preferably controlled by a set of frequency and interval timers (not shown) to achieve a pulsing to avoid plugging of the recycle line. Outlet line 34 provided near the top of vessel 25 conducts regenerated solution from the system.

If desired, auxiliary equipment as shown on the drawing can be added for more efficient recovery of regenerated solution. Thus, flexible line 36 conducts the crystal product exiting in conduit 18 to a set of crystal baskets 37 constructed of a fine mesh material, e.g., a stainless steel mesh. A collection vessel or sump 38 is provided to collect draining liquid from the baskets. Valve 39 and conduit 41 are provided to intermittently recycle the drained liquid back into the system, e.g., into vessel 10 by means of pump 33. During the recycle of the drained liquid, valve 31 is closed.

Of the two major vessels 10 and 25 only the heat exchange-crystallizer 10 need to be constructed of metal, while the larger reservoir vessel 25 preferably is constructed from a less expensive plastic material. The actual materials used for the vessels depend obviously on the chemical composition of the feed solution. For instance, when the feed solution is a highly corrosive, spent metal treatment solution containing sulfuric acid and copper, a type 316 stainless steel is preferred for the vessel 10, while an acid resistant plastic such as polypropylene resin, preferably fiber reinforced, can be used for vessel 25. All conduits can also be made from an appropriate plastic resin.

Although the reaction system of this invention is generally applicable to the continuous regeneration of any solution by crystallization, it is used with particular advantage in the regeneration of noxious metal treatment solutions. For instance, removal of sodium carbonate, which compound builds up in a cyanide plating bath with use, can easily be effected in the described system. Other important uses therefore include the regeneration of acidic, highly corrosive metal treatment solutions used in pickling, etching, bright dipping, chemical milling etc. of workpieces manufactured from metals such as copper and alloys of copper, zinc, nickel, iron and steel. In all of these cases, the treatment solution becomes enriched in dissolved metal, which reduces its activity. The activity can be restored by continuously removing a portion of the dissolved metal from the said solution as a metal salt of anions present in the solution. The invention will be further described with references to such a process for regeneration of a copper etchant.

Thus, spent copper etchant solution containing sulfuric acid, hydrogen peroxide and a relatively high concentration of dissolved copper is introduced into vessel 10 where it is mixed with a crystal recycle stream withdrawn from the bottom of reservoir 25. The mixture is indirectly cooled under vigorous agitation in the metallic vessel to the desired crystallization temperature and retained in said vessel for an average liquid retention time in the range of from about 5 minutes to about 60 minutes. The temperature of the entering etchant typically ranges between about 100° F. and about 180° F., and that of the cool mixture between about 60° F. and about 100° F. The recycle stream, which is in the form of a pumpable slurry, contains copper sulfate pentahydrate crystals having an intermediate particle size ranging on the average from about 50 to about 200 mesh (U.S. sieve), in a crystal concentration typically ranging from about 20 to about 70 percent by weight. The recycle stream is provided in quantities sufficient to result in an initial crystal concentration in the vessel 10 between about 5 and about 50 weight percent, preferably between about 7 and about 25 weight percent. In addition to provide crystal growth in the vessel 10, the function of the added recycle stream is to aid in the heat transfer. Thus, the vigorously agitated crystal slurry greatly reduces the film or boundary layer against the cooling surface thereby minimizing the tendency of formation of crystals on the metallic surface which otherwise would result in fouling and reduced heat transfer. Any crystals formed on the cooling surface are mechanically removed by the scrubbing action of the agitated slurry.

The aforementioned recycling of a large amount of crystals to the cooling-crystallizing vessel 10 is one of the important features of this invention in that it permits continuous operations for extended periods of time without the necessity of cleaning the equipment. However, if cleaning is required, e.g., at the conclusion of the operation or due to an upset in conditions, this can be carried out with a minimum of effort due to the simple design of the vessel and the absence of stationary internals.

Another important feature of the invention is the classification of the crystals according to size in the cooler-crystallizer vessel 10. Through the action of the agitator the smaller size crystals are kept in suspension while only those of a larger average particle size, e.g., in the range of from about 10 to about 100 mesh, settle and accumulate in the solids settling leg 16 as an extremely dense slurry during the interval when the valve 17 is in the closed position. Periodically the valve is opened for withdrawal of the plug of crystals from the settling leg. The frequency and intervals of the valve manipulations depend upon the degree of agitation, the capacity of the settling leg and on the desired solids content of the slurry to be withdrawn. Usually, the valve is maintained in the opened position for about 1 to about 30 seconds and in the closed position for about 1 minute to about 30 minutes. Crystal concentrations as high as about 75 to about 90 percent by weight can be achieved by this method of withdrawal. Additional liquid removal from the crystals can, if so desired, be performed in the crystal drain baskets, from which crystals can be recovered containing only small amounts of mother liquor, e.g., 5–10 percent by weight. In order to allow sufficient time for achieving the additional concentration of crystals, preferably two baskets are employed, such that when one is being filled by the periodic withdrawal through valve 17 the other is draining. By the use of the invention, it is therefore possible to withdraw a crystal product of desired large average particle size and of high solids content without resorting to extraneous and expensive solids-liquid separation equipment such as centrifuges, large filters or hydrocyclones required in conventional crystallization processes. The liquid collected under the drain baskets is returned on an intermittent basis to vessel 10.

The crystals of small particle size ranging on the average from about 100 to about 200 mesh overflow with the mother liquor from vessel 10 into the larger crystallization vessel 25, the bottom portion of which is gently agitated to promote crystal growth, formation of new crystals and desupersaturation of the mother liquor. The average liquid retention time ranges between about 1 and about 12 hours. Settling occurs in this vessel in the quiescent upper portion of the vessel such that a regenerated solution depleted in metal values and substantially free of crystals is withdrawn from the upper portion of the vessel. The larger particles having an average crystal size in the range of from about 50 to about 200 mesh settle and are withdrawn from the bottom of the vessel and recycled to vessel 10, while crystals of smaller particle size remain suspended in the intermediate portion of the vessel until they have grown and settle towards the bottom portion.

In order to provide the desired amount of crystals for recycle to vessel 10, it is often necessary at start up to charge vessel 25 with an initial inventory of crystals.

Vessel 25 serves another important function when considering the regeneration process as an integral portion of the overall etching process. Specifically, the vessel serves as a reservoir holding a relatively large proportion of the total inventory of the etch solution. This reservoir thus provides a buffering or fly-wheel effect so as to stabilize the system against temporary upsets in the etching operation, chemical composition of the solution, recirculation flow-rates and coolant temperatures. This buffering effect becomes particularly important when the volume of the etchant in the working tank (in the etch operation) is small. Automatic spray etchers for printed circuit boards and typical etching troughs for rotogravure cylinders illustrate this. The small volume of solution in these cases makes them particularly sensitive to any variation in production load or chemical composition.

In applying the system of this invention to the regeneration of a spent copper etchant based on sulfuric acid and hydrogen peroxide, the following is provided as a further example of the process operating at steady state conditions. The spent etchant entering line 19 is an aqueous solution initially prepared from 20 vol% of 96.6 wt% $H_2SO_4$, 10 vol% of 50 wt% $H_2O_2$ and 70 vol% water. In the etching process copper has been dissolved to a loading of 41.25 g/l $Cu^{++}$ and it is desired to regenerate this spent etchant to a reduced $Cu^{++}$ level of 28.5 g/l. Spent etchant of a temperature of 130° F. is continuously introduced at a rate of 98.8 l/hr into vessel 10 having an effective volume of about 163 liters. Also an average of about 74.3 l/hr of a recycle crystal slurry containing 30.4% by weight of $CuSO_4 \cdot 5H_2O$ crystals is periodically introduced via conduit 21 into vessel 10, which is indirectly cooled to about 85° F. with about 313.4 l/hr of water entering at a temperature of about 47° F. A crystal product slurry is withdrawn periodically from the vessel by opening the valve for 5 seconds every 5 minutes. The average rate of withdrawal is 6340 gms per hour containing 83% by weight of solids. After draining in the crystal baskets about 5720 gms/hr of large crystals containing 8% by weight of residual liquid are recovered. The slurry of mother liquor and small crystals is introduced by overflow from vessel 10 into vessel 25, which has an effective volumetric content of about 1100 liters. From the bottom of the vessel a crystal slurry containing about 30.4 weight percent crystals is withdrawn at an average rate of about 74.3 l/hr and recycled to vessel 10. Also about 0.5 l/hr of mother liquor is recovered from sump 38, and recycled intermittently to the first vessel to complete the cycle. 95.6 l/hr of regenerated etch solution having a copper loading of 28.5 g/l $Cu^{++}$ is recovered from vessel 25. After replenishing of the regenerated solution with proper amounts of hydrogen peroxide, sulfuric acid and water to compensate for the consumption of these compounds during the etching and regeneration processes, the etchant is ready for reuse.

It should be understood that many variations and modifications can be made to the system and process of this invention without departing from the inventive concept and scope of the appended claims.

What is claimed is:

1. In a two-stage process for the continuous production of crystals of a relatively large average particle size from a chemical solution stream, wherein the temperature of the solution is changed by indirect heat exchange to induce crystallization in the first stage, the solution containing suspended crystals of a relatively small average particle size is continuously passed to the second stage for promotion of further crystal growth and crystals are recovered from said second stage, the improvement which comprises:

rapidly carrying out the indirect heat exchange in the first stage through the wall of a metallic vessel having a smooth interior surface while simultaneously introducing substantially all of the crystals recovered from the second stage into said vessel in quantities sufficient to provide an initial crystal concentration between about 5 and about 50 percent by weight in said vessel, vigorously agitating the resulting slurry to provide a scouring action by the crystals of intermediate average particle size from the second stage on the interior surface, and periodically withdrawing a final crystal product having a relatively large average particle size from a quiescent settling zone extending downwardly from said first stage vessel.

2. A process according to claim 1, wherein said initial crystal concentration is maintained between about 7 and about 25 weight percent.

3. The process of claim 1, wherein the solution containing suspended crystals of a relatively small average particle size is continuously passed to a second stage vessel of larger dimensions that that of the first vessel, gentle agitation is provided in the bottom of said second stage vessel, and the crystals recovered from the second stage are removed from the bottom of the second vessel as settling crystals of an intermediate average particle size.

4. The process of claim 3, wherein the settling crystals is removed from the second vessel as a slurry having a crystal concentration between about 20 and about 70 percent by weight.

5. The process of claim 1, wherein solution withdrawn with the crystals of a relatively large average particle size is separated from said crystals and the separated solution is at least periodically returned to the system.

6. The process of claim 3, wherein the solution introduced into the first vessel is a spent process solution and a regenerated process solution substantially free of crystals is withdrawn from an upper quiescent portion of the second vessel.

7. The process of claim 6, wherein the spent process solution is a spent cyanide plating solution containing excess quantities of sodium carbonate and the crystals are sodium carbonate crystals.

8. The process of claim 6 wherein the spent process solution is a spent acidic metal treatment solution and the crystals are metal salts of anions present in the solution.

9. The process of claim 8, wherein the spent acidic metal treatment solution is an aqueous copper etching solution containing sulfuric acid, hydrogen peroxide and excess quantities of dissolved copper, the regenerated solution is depleted in dissolved copper and the crystals are copper sulfate pentahydrate crystals.

10. The process of claim 9, wherein the average crystal particle size of the final crystal product withdrawn from the first vessel is between about 10 and about 100 mesh.

11. The process of claim 9, wherein the average liquid retention time in the first vessel is between about 5 minutes and about 60 minutes.

12. The process of claim 9, wherein the average liquid retention time in the second vessel is between about 1 and about 12 hours.

13. The process of claim 3, wherein the crystals recovered from the second stage vessel are introduced into the first vessel by pulsation.

14. An apparatus for the continuous production of crystals of a relatively large average particle size from a chemical solution feed stream which comprises:

a first cylindrical metallic vessel having means for heat exchange through the wall, an internal smooth surface, internally positioned agitator means spaced from the wall, a chemical solution feed inlet, a preformed crystal stream inlet, an upper fluid outlet for withdrawal of a suspension of crystals of relatively small average particle size and a solids setting leg extending downwardly from the bottom of said vessel;

means for contacting a heat exchange medium with said wall;

means for periodic withdrawal of final product crystals of relatively large average particle size from said settling leg;

a second vessel in communication with said upper fluid outlet of the first vessel, said second vessel being of larger dimensions than those of the first vessel and having internally positioned agitator means, an upper fluid outlet for recovery of a substantially crystal-free solution and a bottom crystal outlet for recovery of crystals of intermediate average particle size, and means for passing substantially all of the crystals recovered from said bottom crystal outlet to the crystal stream inlet of the first vessel.

15. An apparatus according to claim 14, wherein the second vessel is constructed from plastic.

16. An apparatus according to claim 14, wherein there is additionally provided:

at least one crystal drain basket of fine mesh material, which drain basket is positioned below the crystal withdrawal means of the first vessel;

a liquid collection vessel positioned below the drain basket, and means for at least intermittently withdrawing liquid from said liquid collection vessel and passing it to the system.

* * * * *

UNITED STATES PATENT AND TRADEMARK OFFICE
CERTIFICATE OF CORRECTION

PATENT NO. : 4,159,194
DATED : June 26, 1979
INVENTOR(S) : Frederick Alexander Steward It is certified that error appears in the above-identified patent and that said Letters Patent are hereby corrected as shown below:

Column 2, line 4  - "continuos" should read -- continuous --.

Column 2, line 11 - "soltions" should read -- solutions --.

Column 4, line 24 - "therefore" should read -- therefor --.

Column 6, line 53 - "com-" should read -- con- --.

Column 7, line 24 - "that that" should read -- than that --.

Column 8, line 26 - "setting" should read -- settling --.

Signed and Sealed this

Twenty-fifth Day of September 1979

[SEAL]

Attest:

Attesting Officer

LUTRELLE F. PARKER
*Acting Commissioner of Patents and Trademarks*